United States Patent
Zahn

(10) Patent No.: US 10,707,458 B2
(45) Date of Patent: Jul. 7, 2020

(54) HAND-HELD POWER TOOL

(71) Applicant: Robert Bosch GmbH, Stuttgart (DE)

(72) Inventor: Wolf Zahn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 14/969,178

(22) Filed: Dec. 15, 2015

(65) Prior Publication Data
US 2016/0172641 A1 Jun. 16, 2016

(30) Foreign Application Priority Data
Dec. 16, 2014 (DE) .......... 10 2014 225 998

(51) Int. Cl.
*H01M 2/10* (2006.01)
*H02J 7/00* (2006.01)

(52) U.S. Cl.
CPC ....... *H01M 2/1022* (2013.01); *H01M 2/1055* (2013.01); *H01M 2/1066* (2013.01); *H02J 7/0045* (2013.01); *H01M 2220/30* (2013.01)

(58) Field of Classification Search
CPC .................................. B23B 51/00
See application file for complete search history.

(56) References Cited

U.S. PATENT DOCUMENTS

| 6,729,413 B2* | 5/2004 | Turner ............... H01M 2/1022 173/217 |
| 2008/0135272 A1 | 6/2008 | Wallgren |
| 2012/0061117 A1* | 3/2012 | Nagasaka ............... B25F 5/02 173/217 |
| 2014/0326477 A1* | 11/2014 | Thorson ............... B25F 5/006 173/171 |

FOREIGN PATENT DOCUMENTS

| CN | 101051678 A | 10/2007 |
| CN | 102107422 A | 6/2011 |
| DE | 102012104538 A1 | 11/2013 |
| EP | 2000267 A2 | 12/2008 |
| WO | 2014027439 A2 | 2/2014 |

\* cited by examiner

*Primary Examiner* — Maria Laios
(74) *Attorney, Agent, or Firm* — Norton Rose Fulbright US LLP; Gerard Messina

(57) ABSTRACT

A hand-held power tool includes: a housing and a rechargeable battery pack. A housing interface unit of the housing cooperates with a rechargeable battery pack interface unit of the rechargeable battery pack to provide a mechanical and electrical connection between the hand-held power tool and the rechargeable battery pack. The rechargeable battery pack interface unit includes a locking element, and the housing interface unit includes a contact plate having at least one contact element configured for the electrical contacting with counterontact elements of the rechargeable battery pack. The contact plate represents a component which is detachably connected to the housing, and the contact plate also includes a retaining element for additional fixing of the rechargeable battery pack interface unit to the contact plate.

9 Claims, 5 Drawing Sheets

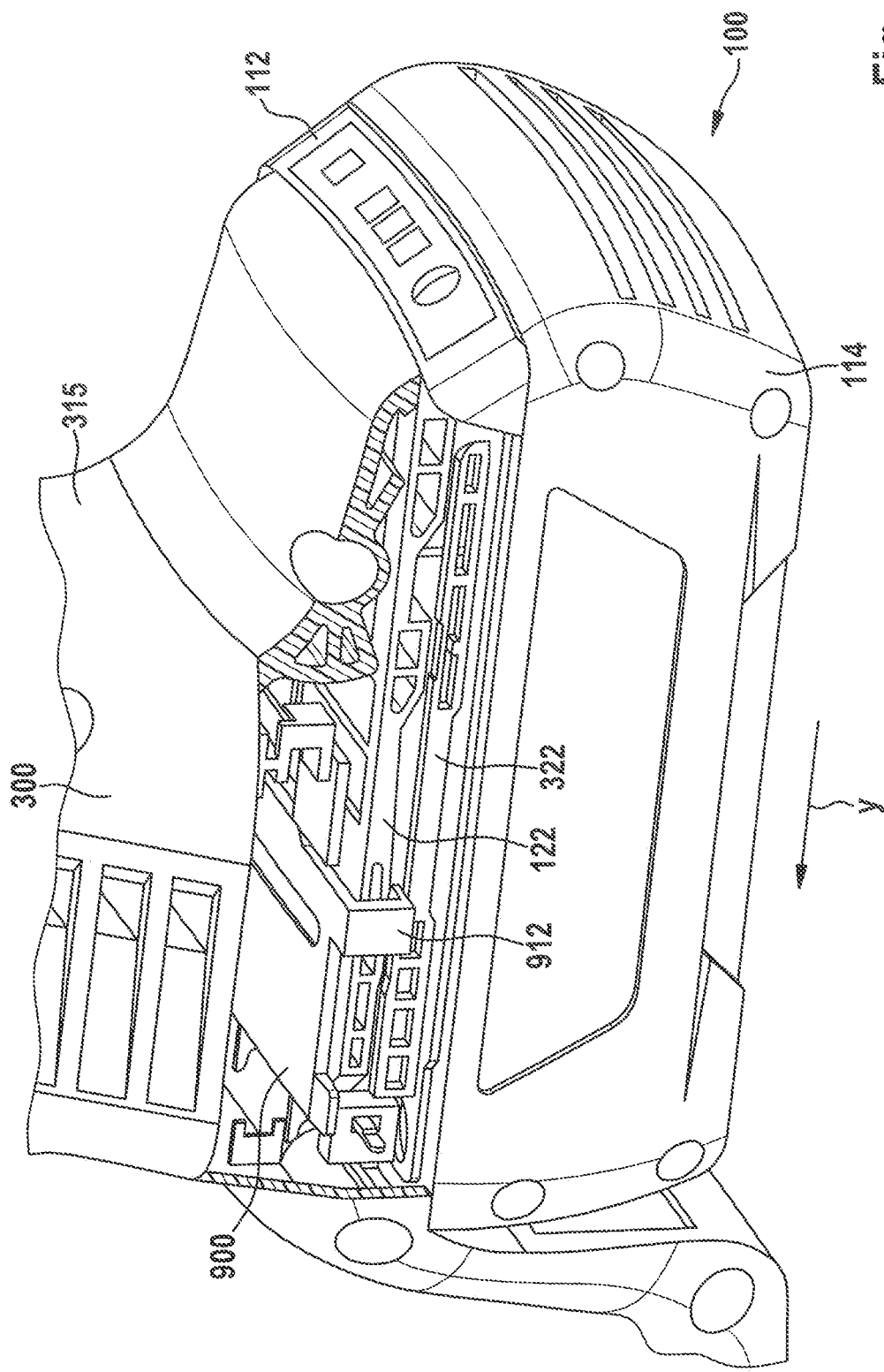

HAND-HELD POWER TOOL

BACKGROUND OF THE INVENTION

1. Field of the Invention

The present invention relates to a hand-held power tool.

2. Description of the Related Art

In principle, the present invention relates to a battery-operated hand-held power tool which includes contact elements that may be brought into contact with countercontact elements of a rechargeable battery pack in order to operate the hand-held power tool in an operating position.

Since battery-operated hand-held power tools allow high flexibility during operation, in particular independently of the power grid, and therefore outdoor work may also be conveniently carried out, it is often provided to use rechargeable battery packs for operating a hand-held power tool.

Rechargeable battery packs of this type are basically known, and include rechargeable batteries, generally a plurality of rechargeable battery cells connected in parallel and/or in series. In the present patent application, a rechargeable battery pack is thus understood to mean a rechargeable battery pack which is preferably made up of electrically interconnected rechargeable battery cells that may store electrical energy which supplies power required for operating the hand-held power tool, and which is replaceably mountable on a hand-held power tool.

During the contacting of the rechargeable battery pack with the hand-held power tool via contact elements combined in an interface, a temperature signal and coding resistance values are generally transmitted in addition to the voltage. In this regard, an interface is understood in particular to mean a device which is provided for directly or indirectly establishing an electrical connection, and in particular a mechanical connection, to a charging device and/or a hand-held power tool.

The coupling of the rechargeable battery pack to the hand-held power tool takes place by plugging or pushing the interface of the rechargeable battery pack into a complementary interface of the hand-held power tool. The interface of the hand-held power tool includes contact blades in which contact elements are situated. The interface of the rechargeable battery pack includes corresponding contact slots in which countercontact elements are situated. When the energy of the rechargeable battery pack is consumed, the rechargeable battery pack may be removed and connected to a charging station which likewise includes an interface with corresponding contact elements. If multiple rechargeable battery packs are available, it is possible to remove the discharged rechargeable battery pack from the hand-held power tool and replace it with a charged rechargeable battery pack.

The rechargeable battery packs as well as the hand-held power tools and charging devices, and thus the respective interfaces, are undergoing constant development, it being customary for additional contact elements and countercontact elements to be implemented in the interfaces in order to exchange additional information between the devices. In principle, it has proven to be disadvantageous that the contact elements and countercontact elements of the rechargeable battery pack and also of the hand-held power tool and of the charging device are exposed to wet surroundings, i.e., with constant wetting of the contact elements and countercontact elements from water, electrolysis, and corrosion.

Protection classes and standards typically define the use of these types of hand-held power tools in various surroundings. It is stated which environmental stresses with regard to contact, the effect of foreign substances, and the effect of moisture a system may be exposed to without being damaged.

For the classification into a standardized protection class, it must therefore be kept in mind that upon constant exposure to moisture, electrolytic corrosion may occur on the contact elements and countercontact elements of the rechargeable battery pack and also of the hand-held power tool and of the charging device, which are generally under voltage, which may result in reduced functioning and safety, and therefore may result in a classification into a more unfavorable protection class.

BRIEF SUMMARY OF THE INVENTION

The object of the present invention is to provide a hand-held power tool which eliminates or at least reduces the disadvantages described above, and which has a preferably cost-effective and simple design. In particular, the aim is to provide a hand-held power tool which, due to good shielding of the electrical interfaces between the hand-held power tool and the rechargeable battery pack and between the hand-held power tool and the charging device, ensures safe and wear-free operation of the hand-held power tool, even in wet surroundings.

According to the present invention, it is provided that a hand-held power tool includes a housing and a rechargeable battery pack, a housing interface unit being provided on the housing which cooperates with a rechargeable battery pack interface unit of the rechargeable battery pack in such a way that a mechanical and electrical connection between the hand-held power tool and the rechargeable battery pack is established.

In addition, the housing interface unit includes a contact plate which includes at least one contact element that is designed for the electrical contacting with countercontact elements of the rechargeable battery pack. The contact plate may be an independent component which during the assembly of the hand-held power tool is positioned in the area of the housing interface unit, and in this sense represents a component which is detachably connected to the housing of the hand-held power tool.

It is provided that the contact plate also includes at least one retaining means for additional fixing of the rechargeable battery pack interface unit to the contact plate. This at least one retaining means ensures that the rechargeable battery interface unit rests against the contact plate and thus against the housing of the hand-held power tool with a high contact pressure, thus effectively preventing penetration of moisture. Once again, electrolytic corrosion of the contact elements is thus prevented, resulting in safe and wear-free operation of the hand-held power tool, even in wet surroundings, and thus, a correspondingly favorable classification into one of the standardized protection classes.

In one preferred specific embodiment, the fixing of the contact plate in the housing interface unit takes place, at least partially, via the at least one retaining means. This may be achieved, for example, in that the retaining means is shaped in such a way that it enters into a force-fit and/or form-fit connection with corresponding structures which are present in the housing of the hand-held power tool. This connection may preferably take place via guide bars on the housing interface unit, the at least one retaining means being situated in at least one guide bar and being engageable with the rechargeable battery pack interface unit.

The at least one retaining means may be designed as a hook-shaped structure on the contact plate. Due to an undercut of a corresponding structure on the rechargeable battery pack interface unit via the hook-shaped retaining means, the additional fixing of the rechargeable battery pack interface unit to the contact plate is particularly easy to achieve.

With regard to symmetrical, redundant fixing of the rechargeable battery pack interface unit to the contact plate, the contact plate may include at least two oppositely situated retaining means which are preferably situated in two oppositely situated guide bars of the housing interface unit. As a result, not only is increased reliability of the connection achieved, but also the interface does not have a tendency to tilt when the various components are put together.

In one preferred specific embodiment, the rechargeable battery pack interface unit also includes guide elements which are engageable with the guide bars of the housing interface unit, the at least one retaining means cooperating with the guide elements in such a way that the additional fixing of the rechargeable battery pack interface unit to the contact plate is effectuated. In this specific embodiment, use is thus made of the fact that structures must already be present anyway on the housing and rechargeable battery pack side which allow a connection of the rechargeable battery pack to the housing of the hand-held power tool. In this case, these structures are the guide bars of the housing interface unit and the guide elements of the rechargeable battery pack interface unit. Thus, due to the hook-shaped retaining means of the contact plate being situated in the guide bar of the housing interface, not only is a connection between the housing interface unit of the hand-held power tool and the contact plate established, but at the same time, an undercut of the hook-shaped retaining means with the guide elements is also produced when the guide elements of the rechargeable battery pack interface are introduced into the guide bars of the housing interface unit, so that as a result, the additional fixing of the rechargeable battery pack interface unit to the contact plate takes place.

In one alternative specific embodiment, the at least one retaining means is formed by at least one hook-shaped structure on at least one contact element which cooperates with at least one corresponding countercontact element of the rechargeable battery pack in such a way that the additional fixing of the rechargeable battery pack interface unit to the contact plate is effectuated.

In all specific embodiments mentioned, it is possible for an additional sealing structure, for example a sealing lip made of flexible plastic, to seal the housing interface unit and the rechargeable battery pack interface unit with respect to one another, and additionally to prevent penetration of moisture. In this specific embodiment, the additional fixing of the rechargeable battery pack interface unit to the contact plate ensures a firmer seating of the additional sealing structure, and a better compression.

Another advantage of the hand-held power tool according to the present invention, with additional fixing of the rechargeable battery pack interface unit to the contact plate, is that vibrations which arise, for example, during operation of the hand-held power tool result in smaller or attenuated relative displacements between the rechargeable battery pack interface unit and the contact plate, which in turn results in less wear on these components, and thus a more reliable connection.

Within the scope of the present patent application, a hand-held power tool is generally understood to mean all hand-held power tools which include a tool carrier which may be set into rotation or translation and which is directly drivable by a drive motor via a gear or via a planetary gear, for example pen-shaped screwdrivers, cordless drills, percussion drills, multifunction tools, saws, shears, grinders, and/or screw drills. In this context, transmission of electrical energy is understood in particular to mean that the hand-held power tool is supplied with energy via the rechargeable battery pack.

Further features, applications, advantages, and embodiments of the present invention result from the following description of the exemplary embodiments of the present invention, which are illustrated in the figures. The description, the associated figures, and the claims contain numerous features in combination. Those skilled in the art will also consider the features, in particular also the features of various exemplary embodiments, individually and combine them into further meaningful combinations. It is noted that the illustrated features have only a descriptive nature, and may also be used in combination with features of other refinements described above, and are not intended to limit the present invention in any way.

The present invention is explained in greater detail below with reference to preferred exemplary embodiments, the same reference numerals being used for identical features. The drawings are schematic.

BRIEF DESCRIPTION OF THE DRAWINGS

FIG. 6 shows a perspective view of a partial area of a hand-held power tool together with an installed contact plate from FIG. 4 and a rechargeable battery pack.

DETAILED DESCRIPTION OF THE INVENTION

Figure 1:
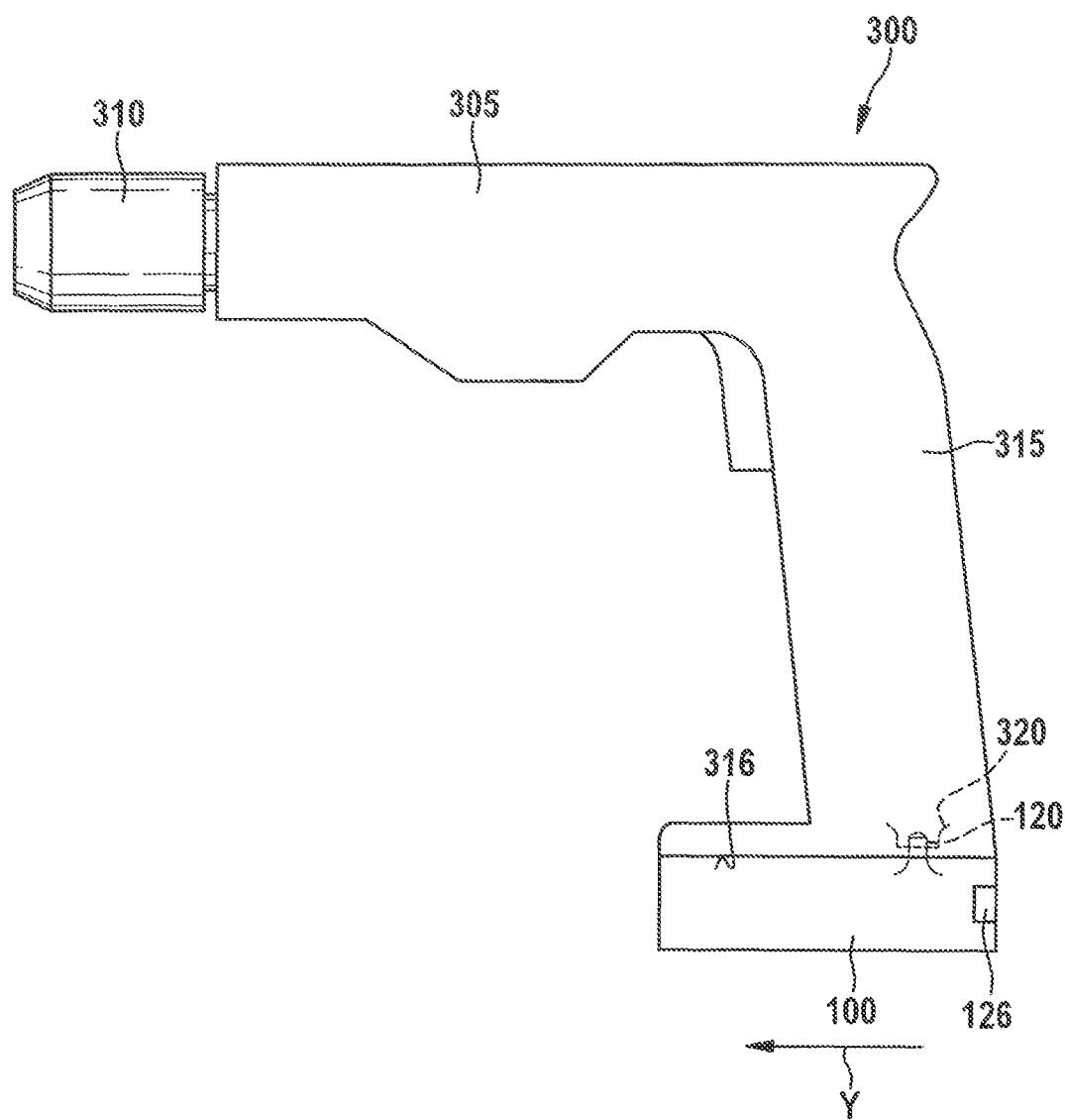
FIG. 1 shows an example of a view of a hand-held power tool which includes a rechargeable battery pack according to the present invention.

FIG. 1 shows an electrical device designed as a hand-held power tool 300. According to the specific embodiment illustrated, hand-held power tool 300 is mechanically and electrically connectable to rechargeable battery pack 100 for supplying power independently of the power grid. Hand-held power tool 300 is designed as a cordless screw drill as an example in FIG. 1. However, it is pointed out that the present invention is not limited to cordless screw drills, and instead may be used for various hand-held power tools 300 which are operated with a rechargeable battery pack 100. Hand-held power tool 300 includes a base body 305 to which a tool receptacle 310 is fastened, and a handle 315 to which a rechargeable battery pack 100 according to the present invention is situated in a locked manner. Rechargeable battery pack 100 is designed as an insertable rechargeable battery pack.

When rechargeable battery pack 100 is mounted on hand-held power tool 300, guide bars 322 (illustrated in FIGS. 5 and 6) provided on hand-held power tool 300 are brought into engagement with corresponding guide elements 122 of rechargeable battery pack 100 (illustrated in FIGS. 2 and 3), rechargeable battery pack 100 being inserted along guide bars 322 in a sliding direction y, and rechargeable battery pack 100 being pushed along a lower outer surface 316 of handle 315, oriented essentially perpendicularly with respect to the longitudinal direction of handle 315, into the rechargeable battery pack receptacle of a hand-held power tool 300. In the position shown in FIG. 1, rechargeable battery pack 100 is fastened to handle 315 of hand-held power tool 300. In the exemplary embodiments illustrated, rechargeable battery pack 100 may be detached from handle 315 of hand-held power tool 300 or from the charging device by actuating an actuating element 126, in particular by pushing rechargeable battery pack 100 along a lower surface of handle 315 in the direction opposite to sliding direction y.

Figure 2:
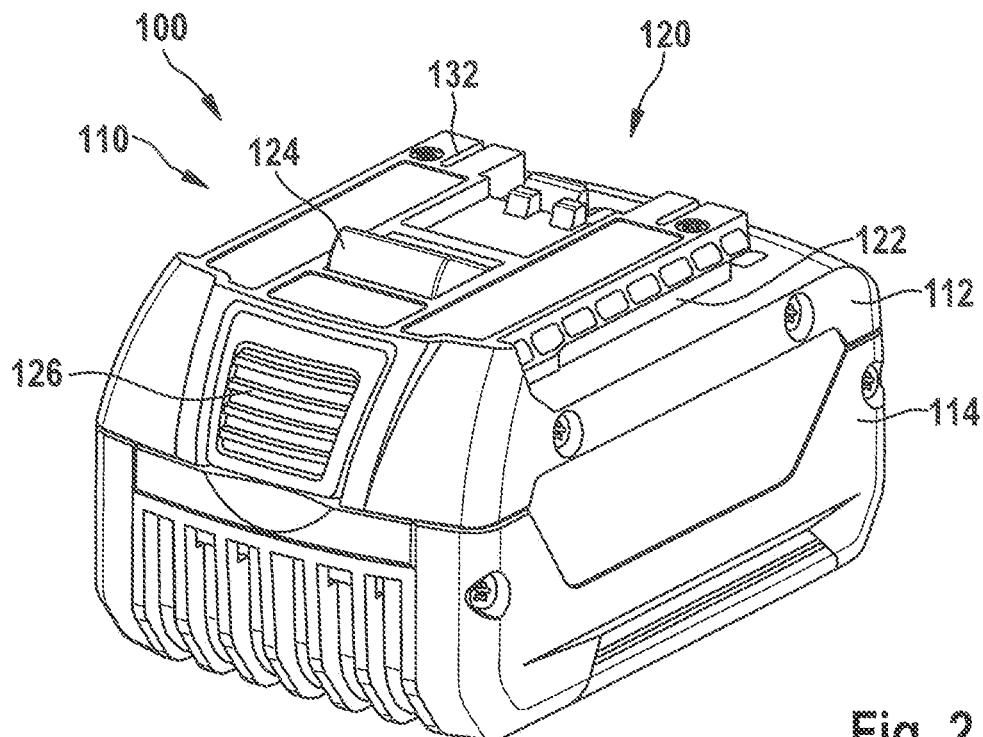
FIG. 2 shows a perspective view of a rechargeable battery pack for a hand-held power tool.
Figure 3:
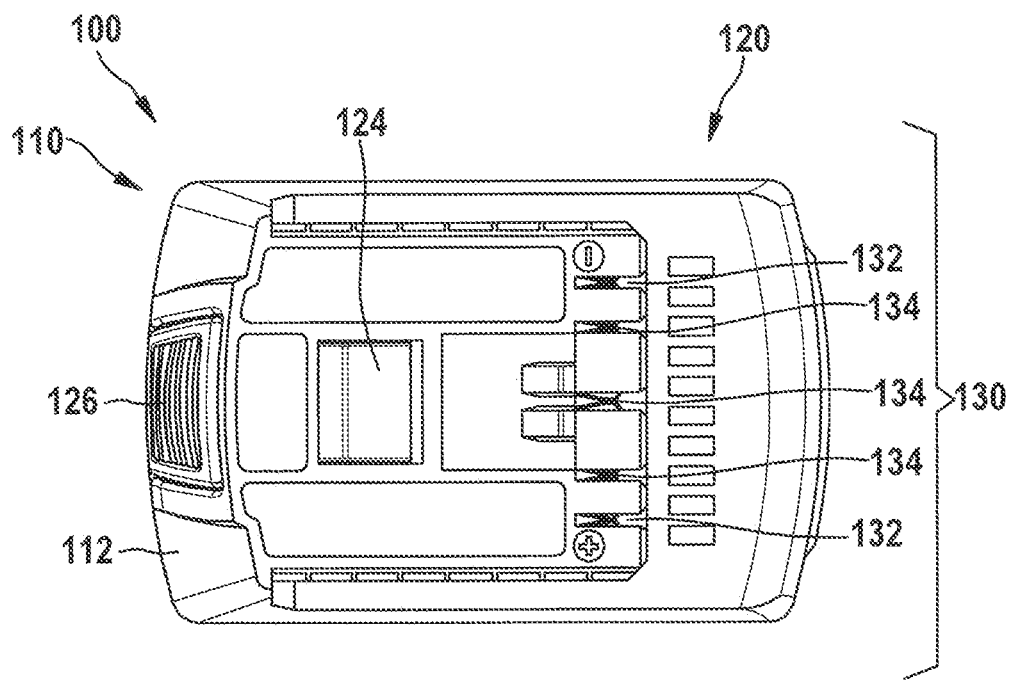
FIG. 3 shows a top view onto the rechargeable battery pack from FIG. 1.

As is apparent in FIGS. 2 and 3, rechargeable battery pack 100 includes a rechargeable battery pack interface unit 120. For locking rechargeable battery pack 100 to housing interface unit 320 of hand-held power tool 300 or to the charging device, at least locking element 124 engages with a corresponding locking recess on housing interface unit 320 of hand-held power tool 300 or on a charging device. In the exemplary embodiments illustrated, rechargeable battery pack 100 may be detached from handle 315 of hand-held power tool 300 or from the charging device by actuating the actuating element 126, in particular by pushing rechargeable battery pack 100 along a lower surface of handle 315 in the direction opposite to sliding direction y. In principle, rechargeable battery pack 100 may also be inserted in the direction opposite to sliding direction y, in which case the unlocking takes place in sliding direction y along guide bars 322 of hand-held power tool 300.

Rechargeable battery pack 100 includes a housing 110 which accommodates a plurality of rechargeable battery cells connected in parallel and/or in series. Housing 110 includes a first housing element 112 and a second housing element 114. In the embodiment variant illustrated, rechargeable battery pack 100 is designed as an insertable rechargeable battery pack. For detachably mounting rechargeable battery pack 100 on hand-held power tool 300 or on a charging device, rechargeable battery pack 100 includes rechargeable battery pack interface unit 120 for the detachable mechanical and electrical connection to corresponding housing interface unit 320 of hand-held power tool 300 or of a charging device.

Rechargeable battery pack interface unit 120 includes guide elements 122 in the form of guide grooves which cooperate with corresponding guide bars 322 on the hand-held power tool or the charging device. Rechargeable battery pack interface unit 120 also includes locking element 124 in the form of a spring-loaded locking bar. An actuating element 126 in the form of a pushbutton is provided for actuating locking element 124. For locking rechargeable battery pack 100 to hand-held power tool 300 or to the charging device, locking element 124 engages with a locking recess, not illustrated, which is formed on a corresponding housing interface unit of a hand-held power tool 300 or of a charging device.

Conversely, in one alternative embodiment not illustrated, a locking element may be situated on the housing interface unit of hand-held power tool 300 or of charging device, and the corresponding locking recess may be situated on rechargeable battery pack interface unit 120 of rechargeable battery pack 100. Rechargeable battery pack interface unit 120 also includes contact elements 130 for electrically contacting rechargeable battery pack 100 with hand-held power tool 300 or with the charging device. Contact elements 130 may be designed as voltage contact element 132 and as signal contact element 134. Voltage contact elements 132 are used as charge and/or discharge contact elements, and signal contact elements 134 are used for transmitting signals from rechargeable battery pack 100 to hand-held power tool 300 or to the charging device, and/or from hand-held power tool 300 or the charging device to rechargeable battery pack 100.

Figure 4:
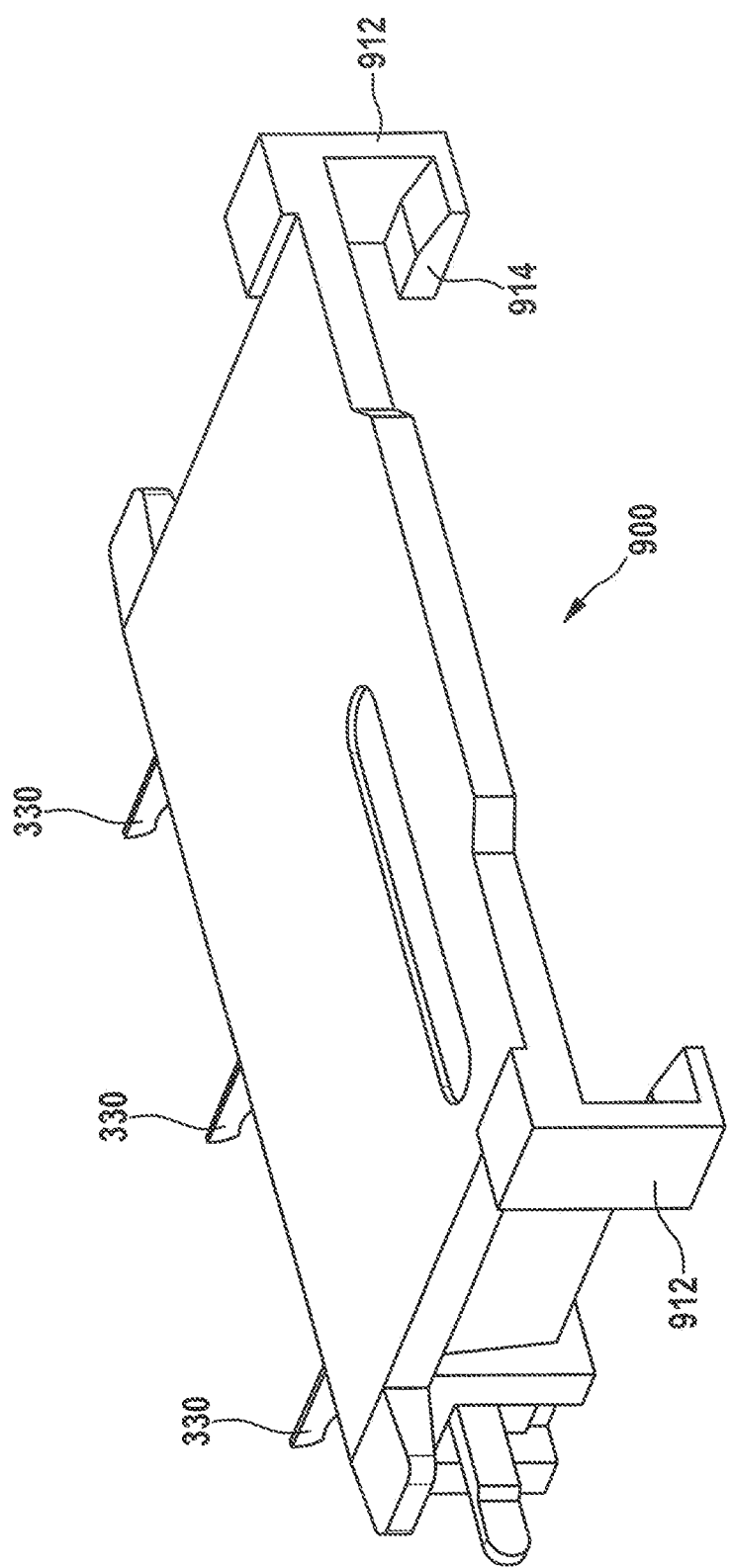
FIG. 4 shows a perspective view of one exemplary embodiment of a contact plate.

A contact plate 900 according to the present invention is depicted in FIG. 4. Three contact elements 330 for the electrical connection between hand-held power tool 300 and rechargeable battery pack 100, as well as hook-shaped retaining means 912, are apparent. The portion of contact elements 330 which is visible in this illustration is used for soldering on cables, not illustrated, for supplying power to contact plate 900. In contrast, FIG. 5 shows the sections of contact elements 330 which are used for contacting with countercontact elements 130 of rechargeable battery pack interface unit 120.

Figure 5:
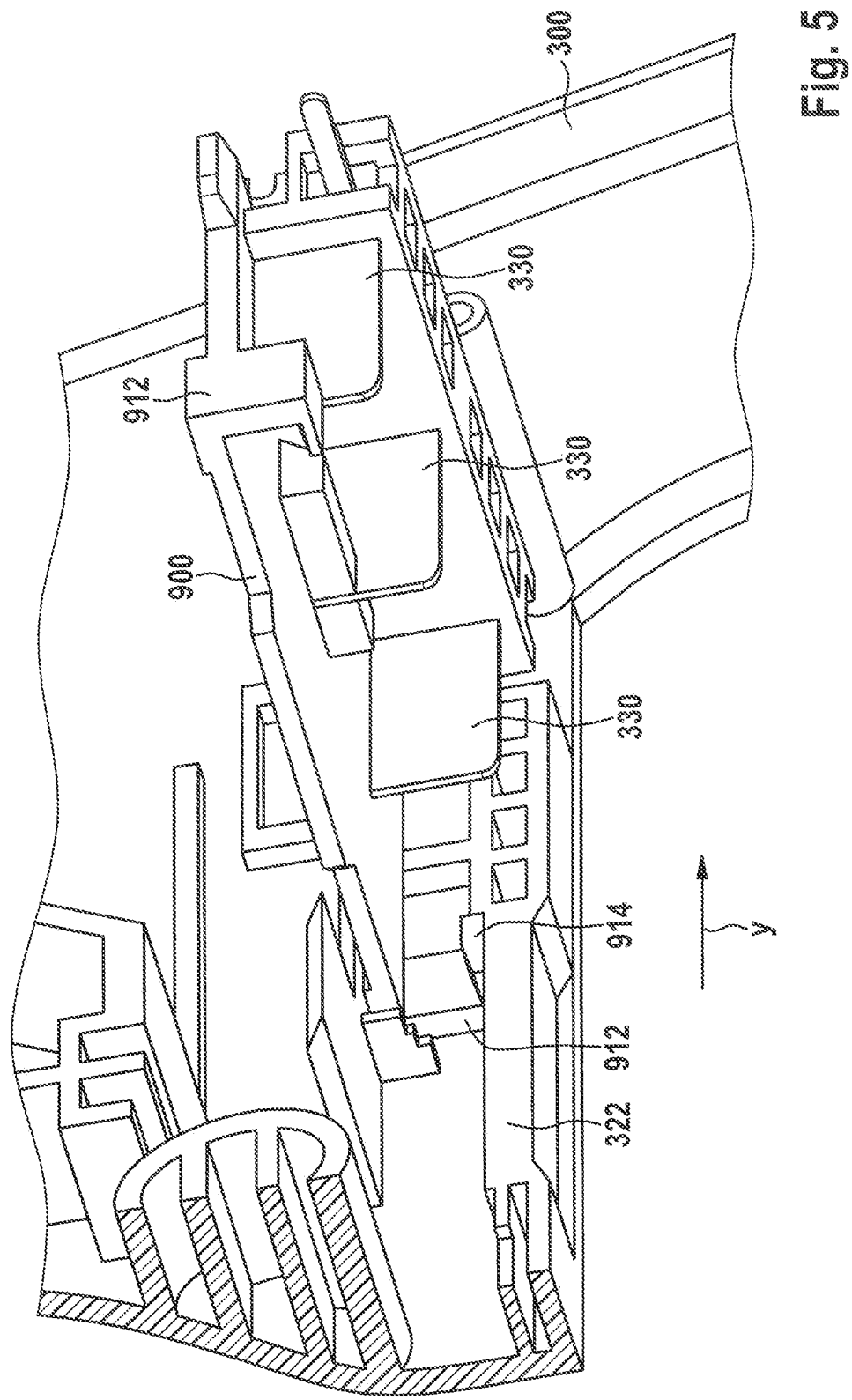
FIG. 5 shows a perspective sectional view of a partial area of a hand-held power tool together with an installed contact plate from FIG. 4.

In this exemplary embodiment, as is apparent in FIG. 5, retaining means 912 are shaped in such a way that they engage with guide bars 322, which are formed in housing 305, after contact plate 900 is mounted in housing 305 of hand-held power tool 300. Contact plate 900 is thus at least partially fixed in housing 305; yet further mounting points between contact plate 900 and housing 305 may be present.

As is apparent in particular from FIG. 6, in the exemplary embodiment, rechargeable battery pack 100 is accommodated by housing interface unit 320 in such a way that guide elements 122 situated on rechargeable battery pack 100 are brought into engagement with guide bars 322 by insertion. Guide bars 322, guide elements 122, and retaining means 912 are formed in such a way that at the same time, the guide elements are also engaged with retaining means 912, and additional fixing of rechargeable battery pack interface unit 120 to contact plate 900 is thus achieved by retaining means 912. Due to a wedge-shaped formation 914 on the inner surface of hook-shaped retaining means 912, as is apparent in FIG. 4, for example, guide elements 122 may be pressed against the underside of contact plate 900 when rechargeable battery pack 100 is inserted into housing interface unit 320, resulting in a fixed connection between rechargeable battery pack interface unit 120 and contact plate 900.

The fixed connection between rechargeable battery pack interface unit 120 and contact plate 900 has the effect that the interface between housing 305 and rechargeable battery pack 100 has a higher resistance to penetrating moisture, which prevents or reduces the electrolytic corrosion of contact elements 330 and countercontact elements 330. This effect may be intensified by providing an additional sealing structure, not shown in the illustration, between rechargeable battery pack 100 and housing 305. This sealing structure may be, for example, a sealing lip made of flexible plastic which seals housing interface unit 320 and rechargeable battery pack interface unit 120 with respect to one another.

In addition, due to the configuration described in this exemplary embodiment, vibrations which may arise, for example, during operation of hand-held power tool 300 result in smaller or attenuated relative displacements between rechargeable battery pack interface unit 120 and contact plate 900, which in turn means lower wear on these components and thus results in a more reliable connection.

In addition to the specific embodiments described and illustrated, further specific embodiments are conceivable which may include further modifications and combinations of features. The description of the figures is used solely for providing an understanding of the present invention.

What is claimed is:

1. A hand-held power tool, comprising:
    a housing; and
    a rechargeable battery pack, wherein the rechargeable battery pack includes guide elements;
    wherein a housing interface unit of the hand-held power tool is provided on the housing and cooperates with a rechargeable battery pack interface unit of the rechargeable battery pack in such a way that a mechanical and electrical connection between the hand-held power tool and the rechargeable battery pack is established,
    wherein the housing interface unit includes at least one guide bar engageable with the guide elements of the rechargeable battery pack and includes a contact plate which has at least one contact element configured for electrical contacting with countercontact elements of the rechargeable battery pack, and wherein the contact plate also includes at least one retaining element for additional fixing of the rechargeable battery pack interface unit to the contact plate,
    wherein the fixing of the contact plate in the housing interface unit is at least partially achieved by the at least one retaining element,
    wherein the at least one retaining element is configured as a hook-shaped structure on the contact plate, wherein an inner surface of the hook-shaped retaining element includes a wedge-shaped formation, as the result of which, when the rechargeable battery pack is inserted into the housing interface unit, the guide elements are pressed against the underside of the contact plate in such a way that a fixed connection is created between the rechargeable battery pack interface unit and the contact plate.

2. The hand-held power tool as recited in claim 1, wherein the contact plate is configured as a detachable component in the housing of the hand-held power tool.

3. The hand-held power tool as recited in claim 1, wherein the housing interface unit includes guide bars, the at least one retaining element being situated in at least one guide bar and being engageable with the rechargeable battery pack interface unit in such a way that the additional fixing of the rechargeable battery pack interface unit to the contact plate is achieved.

4. The hand-held power tool as recited in claim 3, wherein the rechargeable battery pack interface unit includes guide elements which are engageable with the guide bars of the housing interface unit, the at least one retaining element cooperating with the guide elements in such a way that the additional fixing of the rechargeable battery pack interface unit to the contact plate is achieved.

5. The hand-held power tool as recited in claim 3, wherein the rechargeable battery pack and the housing are sealed with respect to one another by an additional sealing structure configured as a sealing lip made of flexible plastic.

6. The hand-held power tool as recited in claim 1, wherein the contact plate includes at least two oppositely situated retaining elements.

7. The hand-held power tool as recited in claim 6, wherein the two retaining elements are situated in two oppositely situated guide bars of the housing interface unit.

8. The hand-held power tool as recited in claim 1, wherein the at least one retaining element is formed by at least one hook-shaped structure on at least one contact element which cooperates with at least one corresponding countercontact element of the rechargeable battery pack in such a way that the additional fixing of the rechargeable battery pack interface unit to the contact plate is achieved.

9. The hand-held power tool as recited in claim 1, wherein the guide elements are configured for engagement with the at least one retaining element.

* * * * *